United States Patent

[11] 3,575,200

| [72] | Inventor | James G. Imeson<br>Box 632, Jackson, Wyo. 83001 |
|---|---|---|
| [21] | Appl. No. | 749,020 |
| [22] | Filed | July 31, 1968 |
| [45] | Patented | Apr. 20, 1971 |

[54] IRRIGATION APPARATUS AND SYSTEM
8 Claims, 11 Drawing Figs.

[52] U.S. Cl. .................................................. 137/344
[51] Int. Cl. .................................................. B05b 9/02, E01h 3/02
[50] Field of Search .......................................... 239/212, 213, 184, 185, 186, 187; 137/344

[56] References Cited
UNITED STATES PATENTS

| 2,786,715 | 3/1957 | Chapin | 239/186 |
| 2,893,422 | 7/1959 | Schultz | 239/186X |
| 3,349,794 | 10/1967 | Behlen | 137/344 |
| 3,394,729 | 7/1968 | Bower et al. | 137/344 |
| 3,425,629 | 2/1969 | Bobard | 137/344X |
| 3,444,941 | 5/1969 | Purtell | 137/344X |
| 3,463,175 | 8/1969 | Rogers | 137/344X |

*Primary Examiner*—Samuel Scott
*Attorney*—Lawrence J. Winter

ABSTRACT: An irrigation apparatus or system comprising a self-propelled vehicle with a water delivery pipe for discharging water therethrough to a field to irrigate it, which delivery pipe is provided with capping means for operatively connecting the water delivery pipe to riser bowl means disposed at spaced intervals along a fixed water supply pipe in the field to be irrigated.

INVENTOR:
James G. Imeson

INVENTOR:
James G. Imeson
BY
Lawrence J. Winter
atty.

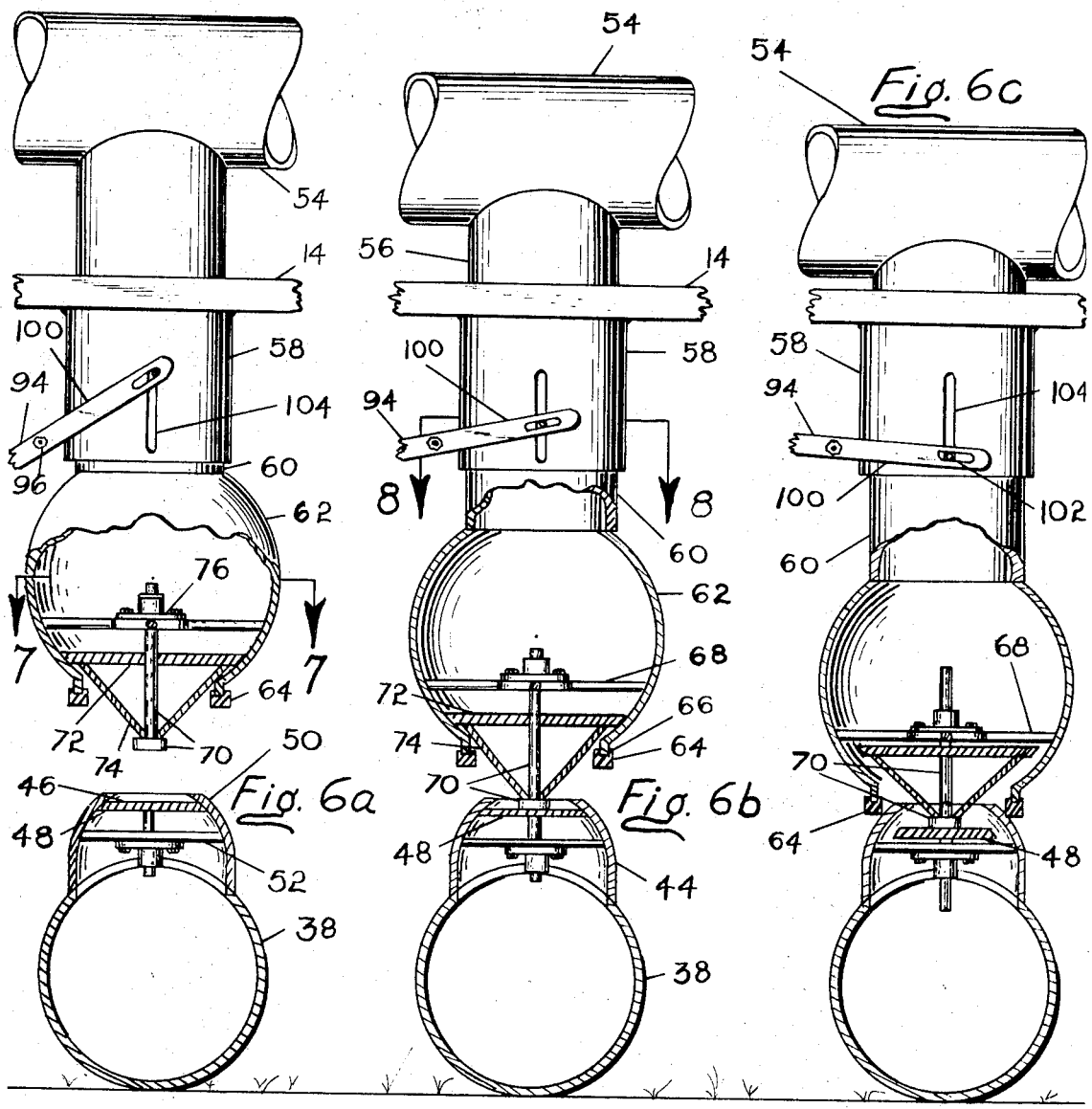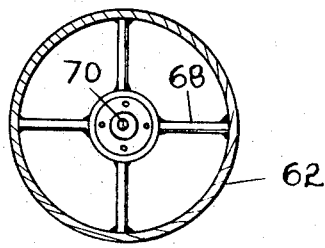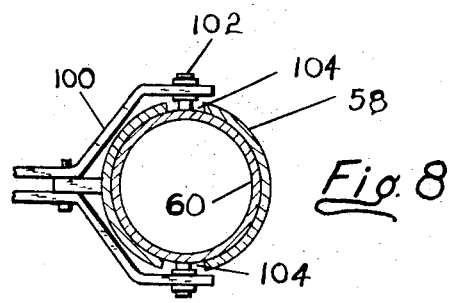

IRRIGATION APPARATUS AND SYSTEM

The present invention relates to an irrigation system and more particularly to an irrigation system in which a transport vehicle is provided for passing along a field, and stopping at predetermined stations in the field for attachment of a water delivery pipe on the vehicle to an individual discharge outlet disposed in a fixed water supply pipeline disposed in the field to be irrigated, whereby a certain localized area of the field may be irrigated and thereafter the vehicle may pass along to the next station for irrigation of the next adjacent portion of the field, so that the field is progressively or sequentially irrigated and the vehicle may return along the same pipeline for further irrigation, as desired.

An object of the present invention is to provide a vehicle having novel capping means thereon for connection to an opening, a valve for discharge of water in a fixed pipe disposed in a field to be irrigated.

Another object of the present invention is to provide a self-propelled vehicle with a water delivery pipe thereon and capping means including drive means for lowering a capping member having striker means thereon for contacting valve means in a fixed pipeline disposed at a riser station in a field to be irrigated, so that the valve means are opened to discharge water from the pipeline and through the capping means and a water discharge delivery pipe for irrigation of a localized area of the field.

Another object of the present invention is to provide a self-propelled vehicle having a water delivery pipe thereon, which vehicle is provided to stop along a series of riser or valve opening means in the pipe, and is further provided with means for capping the valve opening means and admitting water from the riser or valve opening means, so that it passes through the capping means and irrigates the field at this particular area for a predetermined time, and thereafter the valve opening means is closed and the vehicle moves along to the next station and repeats the cycle of operation until the end of the fixed pipe in the field is reached, after which the vehicle can then reverse itself and return to its initial place of starting and repeat the operation as often as required with little or no attention.

Another object of the present invention is to provide a self-propelled vehicle for stopping along predetermined riser openings in a fixed pipe disposed in a field to be irrigated with guide means for guiding the self-propelled vehicle along the fixed pipeline.

Another object of the present invention is to provide a self-propelled vehicle for irrigation purposes which stops along riser valve openings disposed at spaced intervals along a fixed pipe in a field to be irrigated, which further has capping means thereon for attachment of the capping means to the individual risers with sealing means for preventing any leakage between the capping means and the riser means while the valve in the riser means is open.

Various other objects and advantages of the present invention will be readily apparent from the detailed description when considered in connection with accompanying drawings forming a part thereof, and in which:

FIG. 6A is a detailed view illustrating the position of the capping means and the riser valve opening before they are engaged with each other, and the valve is in a closed position;

FIG. 6B illustrates the capping means and the riser valve opening as the striker means of the capping bowl engages the riser valve opening;

FIG. 6C is similar to FIG. 6B, but illustrates the capping means and the riser valve opening after they are secured to each other, and the valve is in an opened position;

FIG. 7 is a section taken along the lines 7—7 of FIG. 6A; and

FIG. 8 is a section taken along the lines 8—8 of FIG. 6B.

Figure 3:
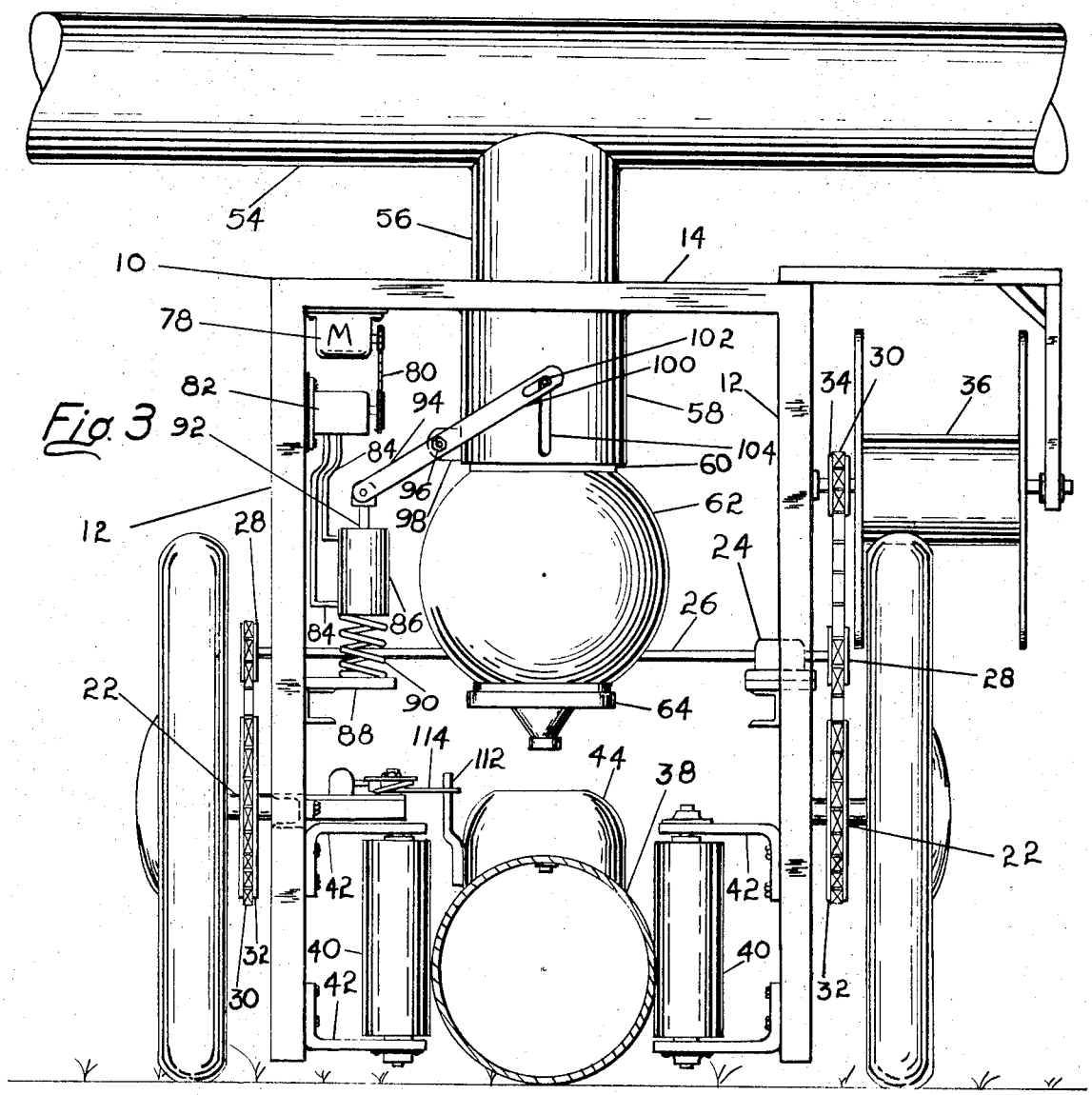
FIG. 3 is an end view of the self-propelled vehicle embodied in the present invention, when it is disposed adjacent a riser in the fixed pipeline and before the capping means embodied in the invention is connected to the riser valve opening means.

Referring to the drawings, the reference numeral 10 generally designates a self-propelled vehicle having a plurality of vertically inclined members 12 disposed at opposite ends of the vehicle to provide a frame along with an upper platform 14 and lower horizontal members 16 and 18 connected to the members 12. The vehicle is provided with large wheels 20 suitably connected to axles 22, as best seen in FIG. 3, connected to the lower members 18. Drive means 24, which comprises an electric motor with a suitable gear reduction means, is provided for propelling the vehicle. A drive shaft 26 extends transversely of the vehicle frame and is provided with sprocket members 28 and chain means 30 operatively connected to the sprocket members 32 fixed to the axles 22 for driving the vehicle. It will be noted that the chain 30 adjacent one of the driven wheels is also connected to a sprocket member 34 which rotates a reel 36 which normally carries an electric cable which supplies electrical power from a source not shown. The reel 36 is utilized to reel up and unreel the electric cable which supplies the source of energy or power for the vehicle as the vehicle is propelled toward or away from the source to which the cable carried by the reel is connected.

The vehicle 10 is disposed over a fixed water supply pipe 38 disposed in the field. The water supply pipe acts as a guide for the vehicle and the vehicle is provided with vertical rollers 40 secured by struts 42 to the members 12, so that the outer surface of the pipe will normally act as a guide for the rollers 40 as the vehicle moves along the longitudinal axis of the water supply pipe 38.

The water supply pipe 38 is provided at predetermined intervals along its axis with water risers or valve openings 44 in which is disposed a valve 46 to prevent water in the water supply pipe 38 from being discharged through or out of the water riser or valve opening until the valve has been unseated. The valve 46 comprises a flat disc 48 adapted to be seated along its circumference against the inner surface of the converging cylindrical portion 50 of the water riser 48. The valve disc 48 is provided with a shaft which is suitably connected by any well-known means to a spider structure 52 and the valve disc 48 may be provided with biasing means to normally maintain the valve disc 48 in its uppermost position, and so as to completely shutoff and close the discharge opening of the riser 44.

Figure 1:
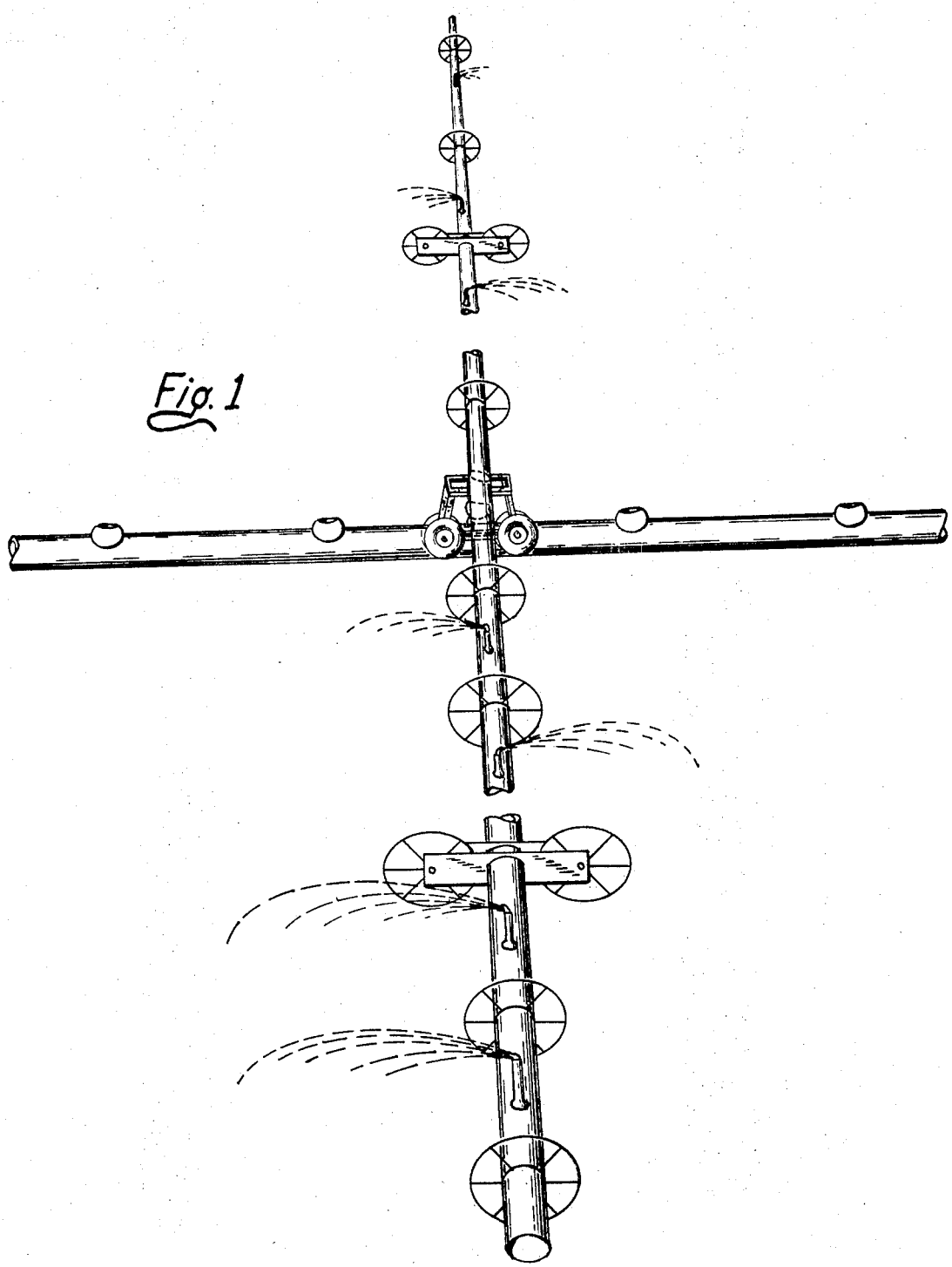
FIG. 1 is a more or less diagrammatic view of the self-propelled vehicle embodied in the present invention.
Figure 2:
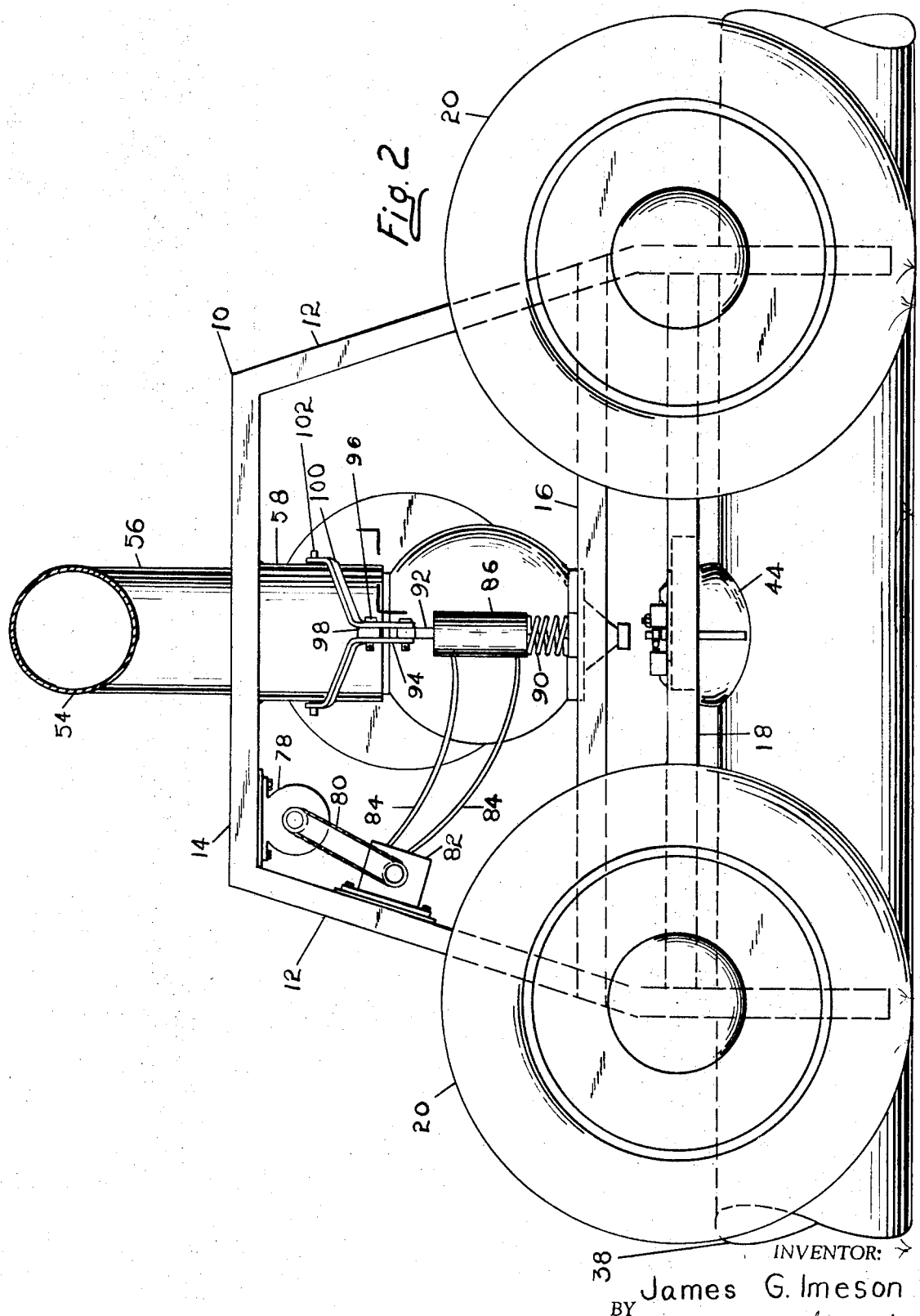
FIG. 2 is a side elevational view of the irrigation vehicle and system embodied in the present invention.

The platform 14 is provided with a substantially horizontally extending water discharge pipe 54 with a vertical connection 56 secured to the platform 14 by any suitable means. The water delivery pipe 54 may extend a considerable distance on either side of the vehicle as best seen in FIG. 1, and may have suitable support means disposed on either side of the vehicle for supporting the ends thereof away from the vehicle. The vertical connection 56 has a sleeve 58 of larger diameter disposed about it, which sleeve 58 is welded to frame 14 to receive a slidable sleeve portion 60 therein. The lower end of connection 56 is designated 60 and is provided with a spherical-shaped member or portion 62, having an annular sealing member or gasket 64 made of resilient material on its lower open end 66.

The spherical capping member 62 is provided with a spider 68 therein, as best seen in FIG. 7, and a slidable striker rod or member 70, on which is mounted a valve disc 72 and a conical structure or cone 74 for movement with the striker rod 70. The valve disc 72 normally closes off the member 62, as best seen in FIG. 6A, when the vehicle is not connected to the water riser 44. The striker rod 70 is adapted to slide upwardly and downwardly in a bearing structure 76 disposed in the spider structure 68. The water within the water delivery pipe 54 and the member 62 normally maintains the valve disc 72 seated against the inner surface of the member 62 when the vehicle is disconnected from the water riser 44.

The water pressure within the pipe 38 normally maintains the valve disc 48 seated, as best seen in FIG. 6A, against the converging inner surface of the water riser 44 when the water riser is disconnected or unattached from the capping member 62.

Referring to FIG. 3, it will be noted that the platform 14 is provided with an electric motor 78 connected by a belt drive 80 to a hydraulic pump 82 supported on one of the vertical members 12. The pump 82 is operatively connected by supply lines 84 to a hydraulic ram or piston member 86. A support member 88 is provided on the member 12 for supporting a biasing member or spring 90 which bears against the ram 86 and is secured thereto by any suitable well-known means. The ram structure is provided with a piston rod 92 pivotally connected to a crossbar or lever 94 having its central portion pivotally connected at 96 to a lug 98 secured to the lower section of sleeve 58. The opposite end portion of the lever 94 is provided with a yoke 100 through which extend pins 102 secured on the opposite sides of the sleeve portion 60 and extending through vertical slots 104 disposed in the lower section of sleeve 58.

The operation of the motor 78 will cause the lever 94 to pivot about its point 96 so as to move the yoke portion 100 of the lever upwardly or downwardly to cause the portion 60 to move from its uppermost position, as shown in FIG. 6A, to its lowermost position extending out of the bottom of the sleeve 58, as best seen in FIG. 6C.

The actuation of the motor 78 so as to move the piston rod 92 in an upward direction and so as to move the yoke 100 in a downward direction and the portion 60 therewith will cause the striker rod 70 to move toward the valve disc 48 of the riser 44. When the rod 70 strikes the valve disc 48, since the water pressure in the pipeline 38 is approximately 80 pounds p.s.i. and the pressure against the valve disc 72 of the capping member 62 is very little, the striker member 70 will begin to move upwardly into the capping member 62, as illustrated in FIGS. 6B and 6C. This will cause the valve disc 72 to become unseated from contact with the inner surface of the capping member 62, so that there will be an annular opening around the circumference of the valve disc 72 and thus, this valve will be in an open position. As the capping member 62 continues to move downwardly, the sealing member 64 will engage the outer surface of the converging portion 50 and will thus form a liquid-type seal between the capping member 62 and the riser 44. Thereafter, the downward pressure of the striker rod 70 forces the valve disc 72, fixed thereto, against the spider 68, as best seen in FIG. 6C, so that the striker rod 70 will then force the valve disc 48 downwardly and unseat it from its closed or seated position with portion 50. Thus, the water from the interior of the pipe 38 will then flow around the lower valve 48 and around the upper valve disc 72 and into the capping member 62 and through the portion 60 and the connection 56 to the water delivery pipe 54, from whence it will be discharged through the various sprinkler openings extending the full length of the pipe 54 and thus, irrigate a large area of the field.

Figure 4A:
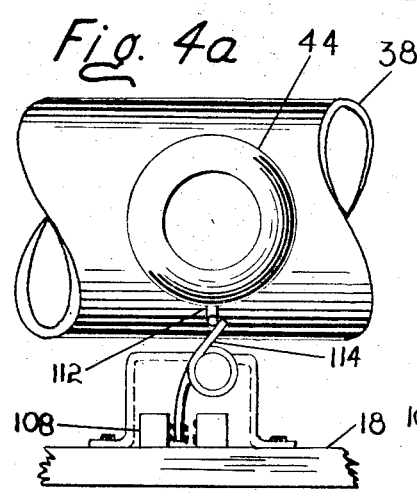
FIG. 4A is a fragmentary view of the self-propelled vehicle's striker arm as it engages the striker arm of the riser valve opening, so as to start the operation of the capping means of the vehicle securing itself to the riser valve opening means in a liquidtight attachment.
Figure 4B:
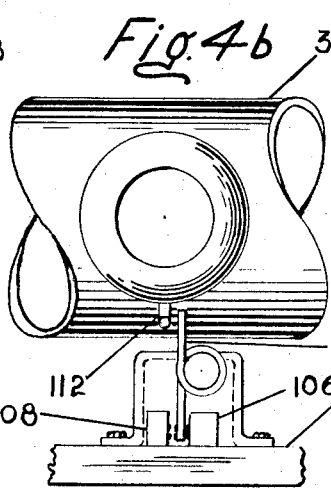
FIG. 4B is similar to FIG. 4A, except that it illustrates the striker arms or poles of the vehicle and the riser opening just before engagement is made between the two arms.
Figure 5:
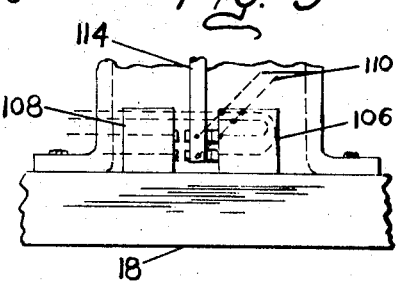
FIG. 5 is a view illustrating the switch of the striker arm on the vehicle illustrated in FIGS. 4A and 4B.

Referring to FIGS. 3 and 4B, it will be noted that the horizontal member 18 is provided with a trigger switch 106 of conventional structure adapted to contact the electric contact 108 suitably connected to the drive motor means 24 and the pump motor 78. This trigger switch 106 is also suitably connected, indicated at 110, to a sequence switch of well-known construction.

The switch is actuated by the vehicle passing adjacent a riser 44 so that a vertical striker bar 112, as best seen in FIG. 3, strikes the striker pole of bar 114 of the switch structure.

As the irrigation vehicle reaches a station, for example, one of the risers 44, the trigger switch bar 114 will engage the striker bar 112 of the riser so as to open a conventional electric circuit to the main drive motor means 24 and stop movement of the vehicle. At this instance, the arm of the trigger switch bar 114 will energize the pump motor 78 by making contact with trigger switch 108 so that the piston rod 92 will cause the lever 94 to pivot from the position shown in FIG. 3 to the position shown in FIG. 6C. This will cause the sequence of operations already described wherein the capping bowl 62 and its striker rod 70 move downwardly so that the valve disc 72 becomes unseated and continuous further movement of bowl 62 downwardly will cause the gasket member 64 to seat against the riser 44 after which the striker bar 70 will be moved upwardly until it will no longer move, at which time the striker rod 70 will then unseat the valve disc 48 so that the riser 44 is in communication with the water delivery pipe 54 for irrigating the field.

It will be noted that the provision of the spring 90 underneath the ram 86 permits adjustment of the ram 86 so that the spring member 90 will prevent excessive pressure on the rubber ring sealing member 64 to provide a cushioning effect and prevent any injury to this gasket should the riser members not be of the same length.

After a short interval of time, the sequence switch, through a secondary electrical circuit, engages the main motor drive means 24 and the vehicle and its water delivery pipe 54 and supporting structure moves along to the next riser station 44 where the sequence of the whole operation is repeated until the entire field or the end of the pipeline is reached. Thereafter, the main drive means is electrically reversed to that the vehicle will return across the whole irrigation system and across the field to its initial place of beginning after a predetermined time. Thereafter, the sequence switch can be activated so that the system and cycle will, as already described, repeat the operation whenever and as often as desired and with little or no attention.

From the foregoing description, it is apparent that the present irrigation system provides a novel, self-propelled vehicle for irrigating along a fixed pipeline in a field. The invention further provides a novel means of lowering a capping member means over individual risers disposed at spaced intervals along the fixed pipe and with dual or double valve means disposed in the capping member and the riser so as to provide a good sealing relationship between these component parts.

The present invention further provides a novel guide means for moving the self-propelled vehicle along a fixed irrigation pipe disposed in a field, as well as novel cushioning means for lowering the capping member means in a sealing relationship with the riser means, where the riser means length may vary.

Inasmuch as various changes may be made in the relative arrangement, form and location of the parts without departing from the invention, it is not meant to limit the scope of the invention except by the appended claims.

I claim:

1. In combination, an irrigation system including a self-propelled vehicle with a water delivery pipe, a water supply pipeline with a plurality of spaced risers, each with a valve therein for supplying water to the water delivery pipe, a capping member with a conical valve therein adapted to seat over each riser to communicate the riser with the delivery pipe, said riser valve comprising a valve disc normally in a closed position, said capping member including a slidable sleeve extending out of the delivery pipe, a sphere with an open bottom secured to the lower end of said sleeve, said conical valve closing off said opening, a gasket around said opening adapted to seal against each of said risers, a striker rod fixed to said conical valve and being substantially longer than the length of said conical valve adapted to strike said riser valve when the sphere is seated on said riser, and pivotal lever means for moving said sleeve and sphere from an uppermost position to a seated position on said riser valve to open each of said valves to cause water to pass from said supply pipe to said delivery pipe.

2. An irrigation device comprising a self-propelled vehicle adapted to move along a fixed pipeline on the ground, having a frame with wheels on the bottom thereof, water discharge means on said vehicle having a substantially horizontal section and a substantially vertical section for discharging water therefrom to irrigate the area, capping means having a sleeve member slidably disposed in said vertical section for detachable connection to riser valves in the pipeline, including a spherical portion in communication with said sleeve member and a valve means in said spherical portion and means for actuating said capping means to connect it in a liquidtight relationship to one of the riser valves, said valve means including a spider member and a striker member carried by spider member, a cone member carried by said striker member including a valve disc adapted to seat against the inner surface of said spherical portion, said valve disc and cone member being fixedly connected to said striker member for movement therewith.

3. The device of claim 2 wherein said striker member is journaled for slidable movement in said spider member.

4. The device of claim 3 wherein said lever means are provided for actuating said capping means, including a crossbar pivotally connected to said vertical section, pin means secured to said sleeve portion and pivotally connected to said crossbar for movement thereby.

5. The device of claim 4 wherein hydraulic ram means are provided on said frame operatively connected to one end of said crossbar for movement thereof to move said sleeve portion with respect to said vertical section.

6. The device of claim 5 wherein cushioning means are provided for said ram means and pump and motor means for actuating said ram means, and switch means for actuating said motor means.

7. The irrigation device of claim 2 wherein electric cable reeling means are supported on said frame adapted to reel and unreel cable thereon as the vehicle traverses over the ground to supply power to the vehicle.

8. The device of claim 7 wherein said vehicle is provided with electric motor drive means and a gear reduction means operatively connected to a drive shaft, and said wheels are connected to said shaft, and a sprocket chain drive means is operatively connected to said shaft and to said reeling means for driving it.